Patented Oct. 6, 1936

2,056,456

UNITED STATES PATENT OFFICE 2,056,456

UREA PLASTICS

Arthur M. Howald, Pittsburgh, Pa., assignor, by mesne assignments, to Plaskon Company, Incorporated, a corporation of Delaware No Drawing. Application December 3, 1931, Serial No. 578,744

16 Claims. (Cl. 18—55)

This invention relates to manufacture of molded urea plastics; and it comprises primarily a method of accelerating the set of molding powders containing condensation products of urea and formaldehyde wherein such molding powder receives an addition of a minimal amount, usually of the order of 0.1 per cent, of benzoyl peroxide or the like, and a molding powder so treated; and it further comprises specifically a method of producing high grade molded articles from urea and formaldehyde wherein formaldehyde and urea are caused to react together in aqueous solution at a low temperature in the molecular proportion of about 1.5:1, the solution so produced, after standing for a time at a temperature not above 25° C. and at a pH of about 6.4, is mixed with wood pulp and the pH adjusted to about 6, using phthalic acid, the mixture so produced is dried by air, the dried material is ground to 100 mesh or thereabouts, pigment being added at this time if desired, and benzoyl peroxide and zinc stearate added, the mixture is made granular, is cooled, pulverized and is finally molded under pressure at a temperature between 130°–180° C. corresponding to 40 to 150 pounds of steam; all as more fully hereinafter set forth and as claimed.

The "pounds pressure" of steam given ante are those of the steam in the platens of the molding press and correspond to temperatures between 130° and 180° C. The heat is conveyed to the mold charge by the walls of the mold and the temperatures within the mold cavity are somewhat lower.

By a high grade molded product is meant one which will withstand an accelerated test consisting in the action of water at a boiling temperature for 30 minutes or so. High grade formaldehyde-urea hot-molded articles are poreless and are free of contained moisture, uncombined urea and uncombined formaldehyde; and are resistant to light, air and moisture. Boiling with water reveals materials defective in any of these ways.

The chemistry of the interaction of formaldehyde and urea is uncertain; but in high grade final molded articles under the present invention the composition represents formaldehyde and urea in about the molecular proportion 1.5:1.

In another and copending application, Serial No. 494,693, whereon the present invention, in some aspects, is an improvement, I have described and claimed a production of high grade final molded articles wherein formaldehyde and urea are brought into interaction in an unheated aqueous solution in the molecular ratio 1.5:1 and at a temperature not exceeding about 25° C.; at least, in the early stages. In this mixture, action goes on quietly; there is no violent interaction such as occurs when the temperature is allowed to rise. About 10 to 12 hours at a temperature around 25° C. are required for completion of the action with the pH ordinarily used; somewhere between 5.5 and 7. In the best embodiment of my invention there described, the liquid was mixed with wood pulp, or sulfite pulp, in amount sufficient to take it up; and the moist material so produced was dried by air at a temperature, of the material, not above, say, 80° C. The dry material was reground and formed a molding powder which, when molding under heat and pressure, gave high grade molded products. The hot pressing was effected at approximately 140° C. under pressure of about one ton per square inch.

In a general way, production of these articles by my hot molding process takes place in four stages; (1) interaction of formaldehyde and urea in aqueous solution; (2) removal of the water and production of a dry molding powder; (3) softening, flowing and forming by heat and pressure and (4) setting by formation of infusible bodies by the heat. In the first stage, an acidity greater than pH 6 much facilitates the complete removal of water in drying, but it gives too quick setting; there is too little time afforded for flow in the mold. On the other hand, neutrality, that is a pH of 7, in interaction gives material difficult to dry and slow setting. If the time of the third stage is too long, it is not only uneconomical but degenerative changes may take place in the hot material. The best results are obtained when the flow time is just long enough to permit penetration of heat throughout the mold charge and production of a sound molding. Instantaneous setting is then desirable.

In the second stage, dry and fusible urea-formaldehyde condensation products are obtained. These are potential resins although not having a resinous character. They are described and claimed in my application Serial No. 597,425 which is a continuation in part of my prior application Serial No. 494,693 mentioned ante. In the fourth stage these fusible potential resins are resinified with the development of infusibility. By the methods described in the present application, I facilitate the development of infusibility; I quickly produce the desired resinification at the time it is wanted, namely, in the fourth stage. At that time the fusible urea-formaldehyde condensation product is rapidly resinified and converted into infusible bodies; heat-setting is after an article has been shaped in the third stage. This is known as heat-hardening. In practice, the third and fourth stages are performed rapidly and successively in hot pressing.

In producing quick setting in the mold, I have heretofore recommended the addition of various potentially acid materials to the molding powders; masked acids developing acidity in the mold by the action of heat. One of these is beta-bromhydrocinnamic acid which liberates HBr. This is a strong acid and produces practically instantaneous setting; but it is apt to be corrosive of the mold. In copending application Serial No. 280,949, there is disclosed and claimed improved methods of accelerating the hardening during hot pressing by developing, in situ and de novo, a compound of markedly acid character capable of facilitating hardening; these new hardening accelerators being so developed from beta-bromhydrocinnamic acid and like compounds. As there stated, beta-brom-hydrocinnamic acid, thermally decomposes at about 100° C.; the hydrobromic acid thus formed being a mineral compound of markedly acid character. Such compounds accelerate the hardening at the proper time and stage in molding and are accelerators developed in situ; developed from the various thermally-decomposable materials disclosed in that application. The present application is a continuation of this prior application and discloses a further improvement wherein the new acidic accelerator, likewise developed in situ, is an organic compound.

Another way of securing the masked acid effect is disclosed in copending application Serial No. 494,693; the use of a resin of the "glyptal" type containing an excess of phthalic anhydrid in solution. With a powdered resin of this type melting at, say, 80° C., mixed with molding powder, there should be a liberation of phthalic acid at temperatures above 80° C. This type of masked acids works well; but its action is susceptible of improvement. For one thing, the mutual solubility of the resins is apt to give a fluxing action below 80° C., so the development of acidity is not as sudden as is desirable. In the present invention, I provide a masked acid of entirely different type, this being benzoyl peroxide or other acid peroxide of high melting point, such as phthaloyl peroxide. Benzoyl peroxide on heating to a temperature of about 105° C., gives up oxygen and becomes benzoic anhydrid which, in turn, becomes benzoic acid. As an acidifying agent in this relation, I find benzoic anhydrid to be a quicker acting body than benzoic acid itself. Benzoyl peroxide gives a highly desirable type of sudden development of acidity in the mold. Its one disadvantage is its action on fugitive dyes. In the absence of this type of dyes, the extricated oxygen is taken up harmlessly. In high grade molding powders under the present invention, there is substantially no free formaldehyde and, hence, the oxygen is not utilized in the formation of formic acid. While I have specifically mentioned benzoyl peroxide and phthaloyl peroxide I regard my invention as including the use of any other acid peroxide decomposing at convenient temperatures to give an acid anhydrid. The two compounds are illustrative of materials which are substantially inert and inactive under ordinary conditions in the molding powder, but which decompose at temperatures occurring within the mass during hot pressing, to form new organic compounds capable of accelerating hardening. The hardening accelerators so developed from the inert compounds are of acidic character and become effective, in situ, at temperatures above 100° C. but below 180° C.; 180° C. being the upper limit of the press temperature.

While I regard benzoyl peroxide to be most useful in a molding powder of the general type of my copending application, Serial No. 494,693, it may be advantageously used in any other molding powders made under the processes of the prior art. In molded articles from any molding powder containing formaldehyde-urea condensation products, a sudden development of non-corrosive acid in the mold is desirable; it is desirable to abbreviate the third stage and accelerate the fourth stage of the actions previously described.

In making a molding powder according to the process of the acknowledged copending application, it is best to use wood pulp as a filler and this is done here. I find that with a pH of 6.4, I can secure complete extrication of moisture in the drying stage, using wood pulp. There is a wick action in the fiber which enables me to get complete drying. With other fillers of less porous nature, such as blanc fixe, a greater acidity than pH 6 is desirable to secure complete desiccation by air drying and this use of greater acidity changes the operation throughout; and, in particular, abbreviates the melt and flow period prior to setting.

In a specific embodiment of my process making high grade molded articles, such as electrical parts, ash trays, toilet articles, etc., commercial urea and commercial formaldehyde solution are mixed in aqueous solution. In working on the large scale, the solution of urea chills the mixture and some heating is necessary to bring the mixture back to the original temperature. The mixture is unheated and is kept at the ordinary temperature, not being allowed to exceed 25° C. during the first two or three hours. This may require artificial cooling. The greater the acidity, the greater the necessity for forced cooling. At a pH of 6.4, which I regard as desirable, all the actions go forward quietly and require 7 to 15 hours for completion. The mixture, after being watched for an hour or two, may be allowed to stand over night and is ready in the morning. The reaction of the solution is adjusted to the stated 6.4 pH by triethanolamine, as the commercial materials used are ordinarily rather acid. Other bases may be used.

With the aqueous solution of the products of reaction, I next mix ordinary commercial wood pulp, which is best sulfite pulp. The amount used is sufficient to give 40 to 50 per cent cellulose in the final molded article. This mixture will take up the liquid to give a moist or doughy mass. This moist mass is dried by air in any convenient way, as by a tunnel drier, until the loss in weight indicates complete drying. At this time, the dry material is usually found agglomerated in masses something like ordinary popcorn. In this shape, it is not convenient for molding and I next grind it in a ball mill, advantageously until it will pass 100 mesh screen. During this grinding, I add pigment to give any color which may be desired and I also add 0.1 to 0.2 per cent of commercial benzoyl peroxide. It is best to mix the benzoyl peroxide with a little of the dry material to make a master batch and use portions of this, since it is difficult to make directly an intimate incorporation of as little as 0.1 per cent. At this time, I usually add as a lubricant, 0.7 per cent zinc stearate which may also be used in a master batch.

The mixture made as so far described is too fine and contains too much air to be convenient for molding. I therefore make it granular by a short treatment in a warm mixer, malaxating it until a more or less putty like product is produced. This is cooled and pulverized to a granular product of size convenient for molding purposes.

Benzoyl peroxide is a dry neutral indifferent powder decomposing at about 105° C. Below that temperature its presence or absence in the molding powder in the amount ordinarily used, 0.1 per cent, makes no appreciable difference; the behavior in the mold is the same. But at 105° C. or thereabout the peroxide decomposes and the composition suddenly hardens. In this way the heat-hardening of the composition is accelerated during hot pressing. The action of the heat upon the organic peroxide facilitates the development of infusibility, that is, conversion of the fusible ureaformaldehyde condensation products into infusible bodies; into hard, infusible, insoluble resins. Benzoyl peroxide carries about 6.6 per cent of active oxygen; and while the oxidizing effect of 0.1 per cent peroxide is consequently vanishingly small, it is nevertheless sufficient to affect sensitive aniline dyes. For this reason discretion in the choice of pigments or colors is required in using benzoyl peroxide as a setting agent.

Molded articles made in the way described are permanent in air and are white unless pigment or dye is added to the composition.

Phthaloyl peroxide may be used in lieu of benzoyl peroxide. It breaks up giving acid and producing set at a somewhat higher temperature, around 135° C.

Benzoyl and phthaloyl peroxides are typical of peroxides of organic acid which decompose between 105° C. and 135° C. to form new organic compounds of acid character. The new accelerator formed is an aromatic compound and such compounds are advantageous in this improvement.

In the described process I may replace part or all of the urea by other substances having the urea structure, such as the substituted ureas (ethyl-urea, phenyl-urea etc.) or thiourea. These other ureas, however, are all more expensive than urea itself and they offer no special advantages in making high grade colorless products. They do, however, give specifically different materials and their use is sometimes advantageous. For one thing, a physical mixture of a urea condensation product with a similar condensation product of a substituted urea gives a wider range of plasticity in the softening step heretofore referred to. With these other bodies of urea structure, the same molecular relations obtain, that is I desire to have as nearly as possible the ratio 1.5:1. Some variation in this ratio is possible as it is not an absolute matter. But in a general way the nearer the materials approach this ratio the better is their stability and their character.

In lieu of using formaldehyde, I can use its polymers and I can use other aldehydes such as furfural, acetaldehyde, etc. They do not, however, offer any special advantage over formaldehyde for the present purposes albeit they make somewhat different products specifically.

In using other urea products as an addition to the urea products under the present invention, the condensation product of the other ureas, of thiourea for example, may be added to the granulated condensation product of urea as a physical admixture; or it may occur in the solution from which the granules are formed.

While I find benzoyl peroxide the best masked acid for the present purposes beta-brom-hydrocinnamic acid or its salts may be admixed with the dry molding powder in the same manner and in about the same proportion. In the mold it gives quick action. However, as stated, there is sometimes a possibility of corrosion by HBr. This possibility depends upon the particular conditions of work.

In the cold condensation of formaldehyde and urea in the manner described, the product is fusible and soluble in water; and it retains this fusibility and solubility more or less up to the final setting stage. It can be extracted from the molding powder with water and after the powder is made it should ordinarily not be exposed to moist atmospheres as moisture may decompose the peroxide.

What I claim is:—

1. In the manufacture of pressure-shaped, heat-set molded articles containing an infusible urea-formaldehyde condensation product, by hot pressing, the improved process which comprises adding benzoyl peroxide to a dry molding powder comprising fusible, heat-hardening reaction products of urea and formaldehyde and hot molding under pressure, the final temperature being above 105° C., said peroxide being capable of developing acidity and accelerating heat-hardening at molding temperatures, without hindering said molding to produce sound, stable, molded articles.

2. As a new improved product useful in making high grade molded articles by molding under heat and pressure, a dry molding powder comprising fusible reaction products of a urea and formaldehyde and a peroxide of aromatic acid, said peroxide being substantially inert in the molding powder under ordinary conditions and ineffective at temperatures below 105° C., but capable of decomposing at temperatures between 105° and 180° C. to form new organic compounds of acidic character.

3. The improved product of claim 2 in which said peroxide is benzoyl peroxide.

4. The improved product of claim 2 in which said peroxide is phthaloyl peroxide.

5. In the manufacture of high grade molded articles containing infusible urea-formaldehyde condensation products, by processes involving hot molding a molding powder under pressure, the steps which comprise reacting together approximately 1.5 mols of formaldehyde with 1 mol. of urea in an aqueous solution having a pH value of about 6.4, maintaining the reaction mixture at a temperature not exceeding 25° C. until the formaldehyde has combined with the urea, mixing the solution of combined product thus obtained with a porous, fibrous filler, the amount of filler being sufficient to produce a moist mass, air drying the moist mass in such a manner that the temperature of the impregnated material does not exceed 80° C., grinding the dried material to a powder, mixing the powder with a peroxide of an organic acid and a lubricant, mechanically working the mixture until the working agglomerates the powder into coarse particles, cooling the agglomerated material, pulverizing to a granular product, and molding the granular product under heat and pressure to give high grade molded articles, said peroxide being substantially inert in the molding powder under ordinary conditions and ineffective at temperatures below 105° C., but capable of decomposing below 180° C. to form new organic compounds.

6. In the manufacture of high grade molded articles by processes involving hot molding a molding powder under pressure, the steps which comprise mixing together to a moist mass a filler and an aqueous solution of a condensation product of a urea and formaldehyde, air drying the moist mixture, grinding the dried mixture to a fine powder, mixing the powder with an inert substance capable of liberating an acid at a molding temperature, mechanically working the mixture until the working agglomerates the fine particles into coarser particles, cooling the agglomerated material and pulverizing the cooled agglomerated material to a granular product, said substance being substantially inert in the molding powder but capable of decomposing between 100° C. and 180° C.

7. As a new product an improved molding composition in dry, granular form and suitable for molding under heat and pressure with the production of high grade molded articles, said granular molding composition being obtainable by the method of claim 6 and each of the granules thereof comprising a fusible reaction product of a urea and formaldehyde, a filler, and an inert substance capable of liberating an aromatic acid at a hot molding temperature, said substance decomposing at temperatures between 105° C. and 135° C.

8. The improved molding composition of claim 7 which contains a lubricant facilitating molding, said lubricant being a component part of said granules.

9. The improved molding composition of claim 7 which contains zinc stearate as a lubricant facilitating molding, said zinc stearate being a component part of said granules.

10. In the manufacture of pressure-shaped, heat-set, molded articles from dry molding compositions containing fusible, urea-formaldehyde condensation products by hot-pressing, wherein heat-setting and development of infusibility are accelerated by development of acidity in situ during molding, the improvement which comprises so accelerating heat-setting and the formation of infusible bodies, by acidity developed from and by means of a peroxide of a carboxylic acid of the benzene series contained in said molding composition, said peroxide being capable of developing acidity and accelerating heat-hardening to the infusible state at molding temperatures, without hindering said molding to produce sound, stable molded articles, said peroxide decomposing between 105° C. and 135° C.

11. As a new improved molding composition useful in making, by hot pressing methods, high grade molded articles containing an infusible resinified urea-formaldehyde condensation product, a substantially dry molding composition comprising benzoyl peroxide and a fusible potential resin having formaldehyde and urea residues combined in the aproximate molecular ratio of 1.5:1, said potential resin being an arrested, low-temperature, reaction product of formaldehyde and urea, formed in a slightly acid aqueous solution and being soluble, fusible and substantially free of volatiles, said potential resin being further capable of heat-hardening to give stable, hard, insoluble, infusible resinified masses, and said benzoyl peroxide facilitating development of infusibility during hot pressing of the mixture.

12. As an improvement in the manufacture of molded articles by hot pressing dry, fusible reaction products of urea and formaldehyde, the improvement in accelerating hardening of such products during hot molding which comprises developing and generating, in situ and de novo, an anhydrid of an aromatic carboxylic acid.

13. As an improvement in the manufacture of molded articles by hot pressing dry, fusible urea-formaldehyde reaction products, the improvement which comprises accelerating the hardening of the composition by means of an accelerator thereof developed in situ, during hot pressing, from a relatively inert substance admixed with said dry reaction products, said inert substance being an organic compound thermally decomposing at temperatures above 100° C. but below 180° C., to form a new organic compound of markedly acid character capable of accelerating the said hardening, said original inert organic compound being ineffective in the composition prior to hot pressing and below 100° C.

14. In the manufacture of pressure-shaped, heat set molded articles containing infusible resinified urea-formaldehyde resins from dry molding powders containing fusible non-resinous urea-formaldehyde condensation products, the step which comprises adding to such a powder an inert organic compound stable at temperatures below 105° C. but capable of decomposing at temperatures between 105° and 135° C. to form an organic compound of acid character capable of accelerating resinification when the powder is hot pressed.

15. The process of claim 14 wherein the improved molding composition so obtained is subsequently hot molded under pressure at a temperature between 105° and 180° C.

16. In the conversion of dry fusible non-resinous urea-formaldehyde condensation products into infusible, stable shaped resins by molding under heat and pressure, the improvement which comprises forming an organic acidic substance during molding by thermal decomposition of an organic peroxide admixed therewith after the first application of heat and pressure, said decomposition and said conversion being effected at a temperature above 105° C. but below 180° C., and said peroxide being stable at temperatures below 105° C.

ARTHUR M. HOWALD.